Nov. 13, 1923.

C. C. MARBLE 1,473,680

TIRE ATTACHMENT

Filed Aug. 12, 1922

C. C. Marble
INVENTOR

BY *Victor J. Evans*
ATTORNEY

WITNESS:

Patented Nov. 13, 1923.

1,473,680

UNITED STATES PATENT OFFICE.

CHARLES C. MARBLE, OF BRADENTOWN, FLORIDA.

TIRE ATTACHMENT.

Application filed August 12, 1922. Serial No. 581,422.

*To all whom it may concern:*

Be it known that I, CHARLES C. MARBLE, a citizen of the United States, residing at Bradentown, in the county of Manatee and State of Florida, have invented new and useful Improvements in Tire Attachments, of which the following is a specification.

My present invention has reference to a blow-out section or patch for automobile tires, and has for its object to produce a device of this character comprising a member tapered at its ends, having its edges beaded and being provided on one of its sides with a flap designed to rest on the other side when the device is in position in a tire casing, and when in such position the beaded edges of the device will rest between the edges of the casing on the metal rim so that both the inner tube and the casing are effectively protected.

To the attainment of the foregoing, reference is to be had to the drawing which accompanies and forms part of this application.

In the drawing:—

Figure 1:
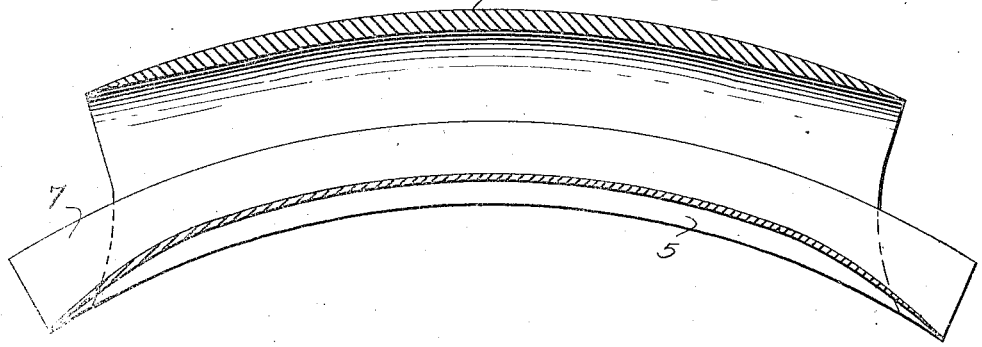
Figure 1 is an approximately central vertical longitudinal sectional view through the improvement.

Referring now to the drawing in detail, the numeral 1 designates a tire casing of the usual construction, 2, the rim on which the tire is mounted, and 3 the inner tube. The casing 1, when injured from blow-outs, cuts or rim cuts, has arranged therein my improved blow-out patch or section which is broadly indicated by the numeral 4, the member 4 also receiving therein the inner tube 3.

Figure 2:
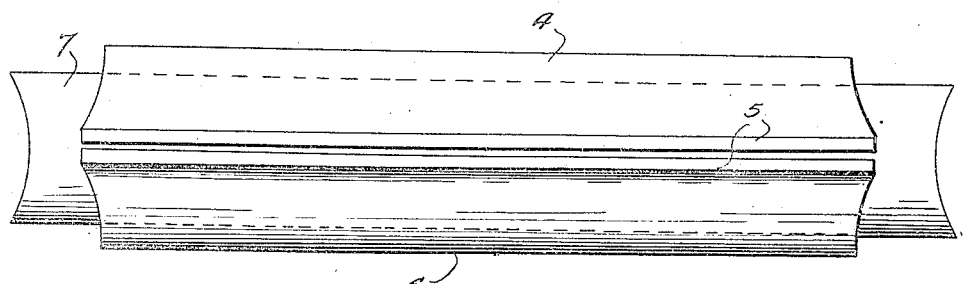
Figure 2 is a bottom plan view thereof.
Figure 3:
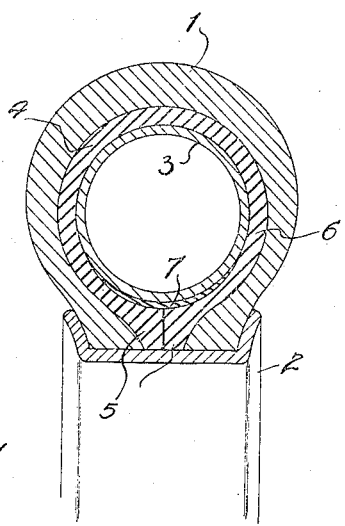
Figure 3 is a transverse sectional view illustrating the application of the improvement on a tire.

The section is constructed of rubber and rubber fabric and is of a desired length. The section conforms in shape to the inner contour of the casing 1. The section 4 is gradually tapered from its center to its ends and is preferably, but not necessarily, reduced in thickness from its center to its edges. Its edges are provided with beads 5, and these beads are designed to be received inward of the beaded edges of the casing and to rest on the rim 2, as disclosed in Figure 2 of the drawing. One of the sides 6 of the improvement 4, has integrally formed on its inner face a flap 7, and this flap is designed to be arranged over the edges 5 and against the opposite side wall of the member 4 when the said member is in operative position.

With my improvement it will be noted that the tube 3 is not permitted to rest on the rim 2 nor to be compressed between the spaced edges of the casing 1. The improvement effectively protects both the casing and the tube, preventing foreign matter passing through the casing and contacting the tube.

It is thought that the foregoing description, when taken in connection with the drawing will fully set forth the construction and advantages of the improvement to those skilled in the art to which this invention relates, and that further detailed description will not be required.

Having described the invention, I claim:—

A blow-out section for tire casings comprising a vulcanized rubber member substantially tubular in cross section tapered longitudinally from its inner center to its ends, said member having its edges thickened to provide beads whose confronting faces are straight and whose outer faces are curved inwardly, and said member having one of its sides provided with a flap designed to rest on the opposite side of the member when the device is arranged in a tire casing and receives a pneumatic tube therein, and said member when mounted with the casing on the tire receiving rim of a wheel designed to have the flat confronting faces of its beads brought into contact with each other by the pressure of the inner surfaces of the ends of the casing against the rounded outer surfaces of the beads, and the outer edges of the beads also designed to rest directly on the tire carrying rim of the wheels.

In testimony whereof I affix my signature.

CHARLES C. MARBLE.